US009462910B2

(12) United States Patent
Perentes et al.

(10) Patent No.: US 9,462,910 B2
(45) Date of Patent: Oct. 11, 2016

(54) PIVOTALLY CLOSING BEVERAGE INGREDIENT HOLDER WITH A LOCK

(75) Inventors: Alexandre Perentes, Lausanne (CH); Enzo Bonacci, Savigny (CH); Antoine Ryser, Lausanne (CH); Jean-Luc Colantonio, Domdidier (CH)

(73) Assignee: Nestec S.A., Vevey (CH)

( * ) Notice: Subject to any disclaimer, the term of this patent is extended or adjusted under 35 U.S.C. 154(b) by 249 days.

(21) Appl. No.: 14/232,493

(22) PCT Filed: Jul. 12, 2012

(86) PCT No.: PCT/EP2012/063654
§ 371 (c)(1),
(2), (4) Date: Jan. 13, 2014

(87) PCT Pub. No.: WO2013/007776
PCT Pub. Date: Jan. 17, 2013

(65) Prior Publication Data
US 2014/0290495 A1    Oct. 2, 2014

(30) Foreign Application Priority Data

Jul. 12, 2011  (EP) .................................... 11173521

(51) Int. Cl.
*A47J 31/06*  (2006.01)
*A47J 31/22*  (2006.01)

(52) U.S. Cl.
CPC .............. *A47J 31/22* (2013.01); *A47J 31/0689* (2013.01)

(58) Field of Classification Search
CPC .. A47J 31/0673; A47J 31/0689; A47J 31/22; A47J 31/3695; A47J 31/407
USPC ........... 99/295, 302 C, 323; 426/77–78, 115, 426/433
See application file for complete search history.

(56) References Cited

U.S. PATENT DOCUMENTS 8,475,860 B2 * 7/2013 Colantonio ............. A47J 31/22
426/431
8,813,634 B2 * 8/2014 Yoakim ................... A47J 31/22
426/115

(Continued)

FOREIGN PATENT DOCUMENTS

WO    2009043630    4/2009
WO    2010066705    6/2010

OTHER PUBLICATIONS

International Search Report for International Application No. PCT/EP2012/063654 mailed on Aug. 17, 2012.

(Continued)

*Primary Examiner* — Dana Ross
*Assistant Examiner* — Lindsey C Teaters
(74) *Attorney, Agent, or Firm* — K&L Gates LLP

(57) ABSTRACT

A receptacle holding unit (1) for a device for preparing a beverage from an ingredient contained in a receptacle (2). A first part (10) and a second part (20) are movable between a closed position for holding said receptacle and an open position for inserting said receptacle and/or for removal therefrom. A fastening arrangement comprises a locking member (30) movable between: —a locking position for preventing relative rotational movement of the first and second engagement surfaces (11, 21) when the parts (10, 20) are in the closed position; and —an unlocking position for allowing relative rotational movement of the of the first and second engagements surfaces (11, 21) and engagement and disengagement thereof.

18 Claims, 6 Drawing Sheets

(56) References Cited

U.S. PATENT DOCUMENTS

| | | | |
|---|---|---|---|
| 2010/0239734 A1* | 9/2010 | Yoakim | A47J 31/22 426/433 |
| 2010/0266739 A1* | 10/2010 | van Hattem | A47J 31/22 426/433 |
| 2011/0217421 A1* | 9/2011 | Perentes | A47J 31/22 426/80 |
| 2011/0244099 A1* | 10/2011 | Perentes | A47J 31/3695 426/431 |
| 2011/0293805 A1* | 12/2011 | Perentes | A47J 31/22 426/433 |

OTHER PUBLICATIONS

International Preliminary Report on Patentability for corresponding International Application No. PCT/EP2012/063654 mailed on Jan. 23, 2014.

* cited by examiner

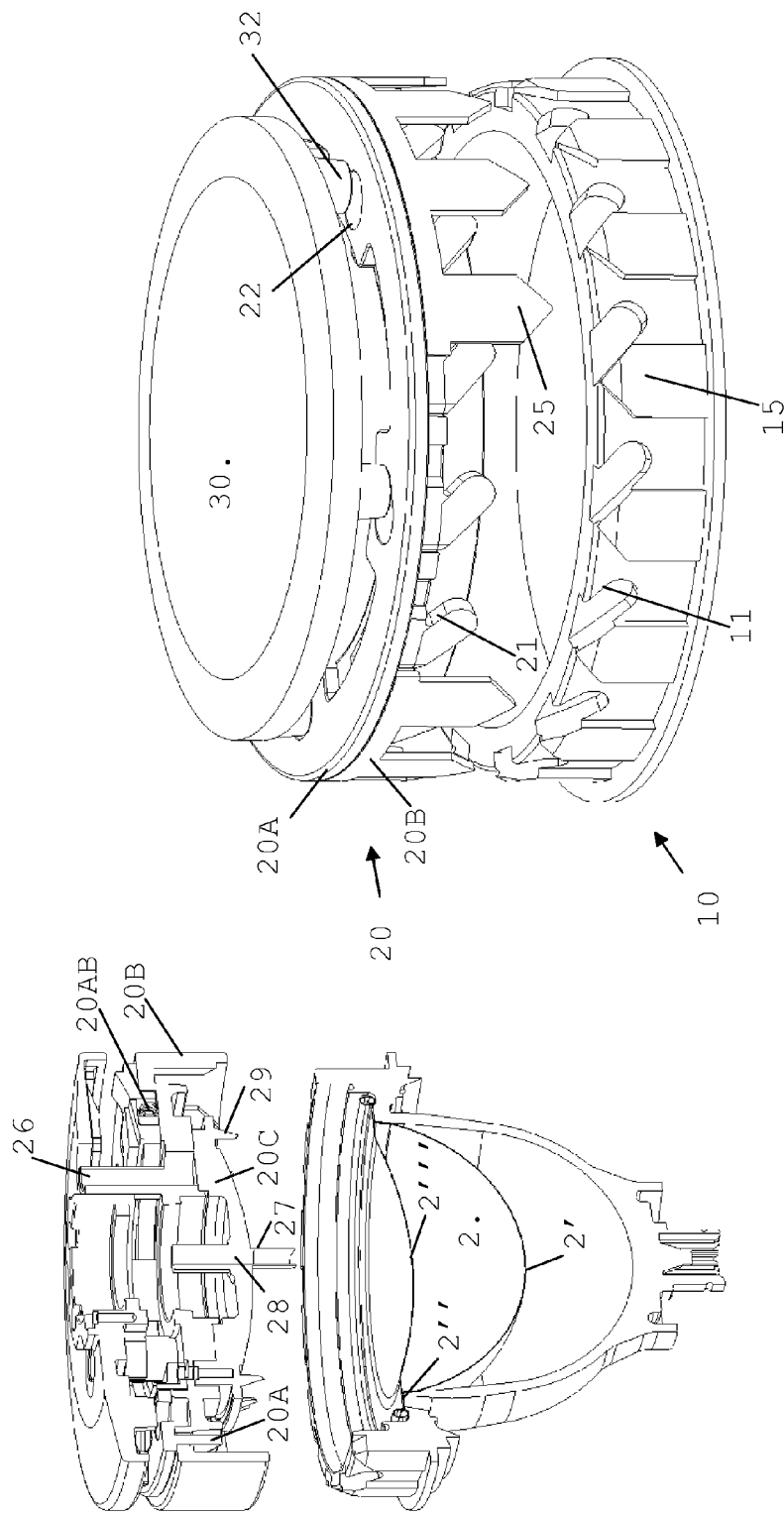

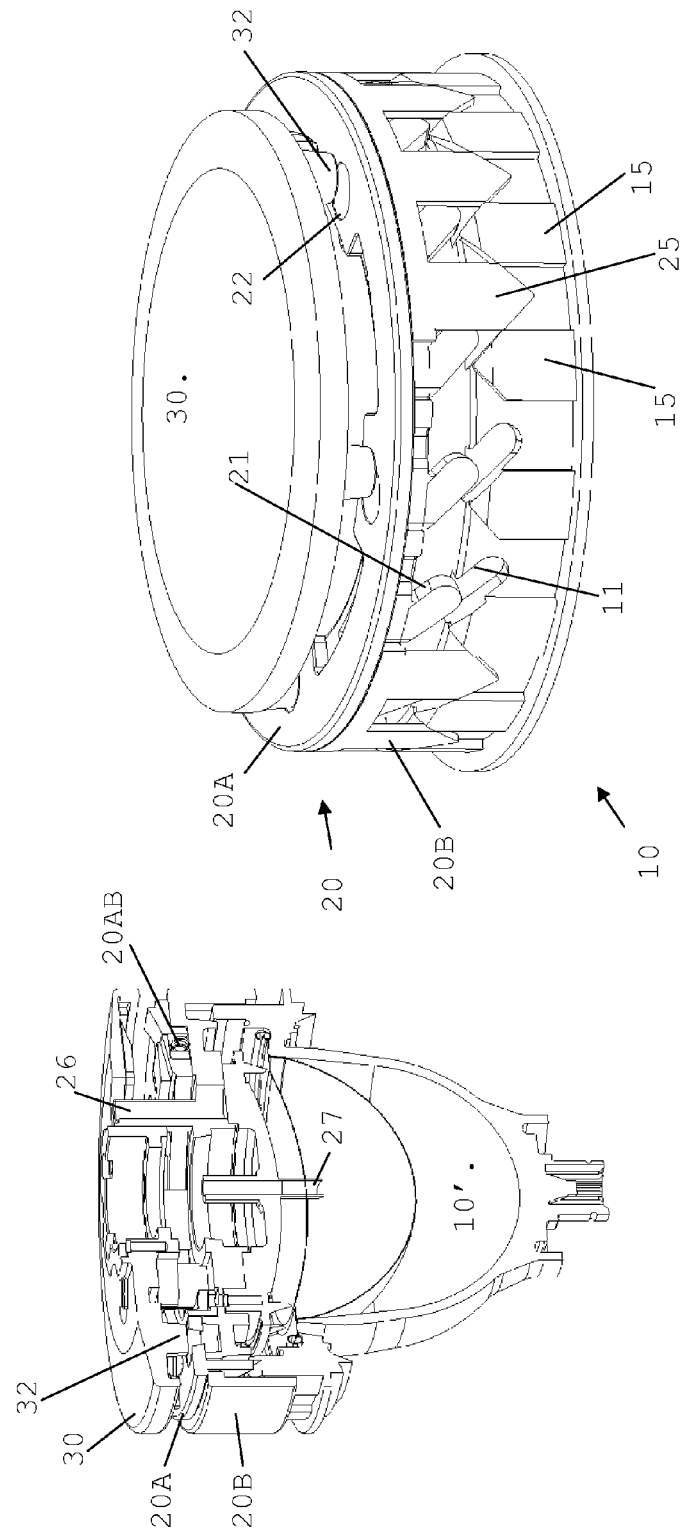

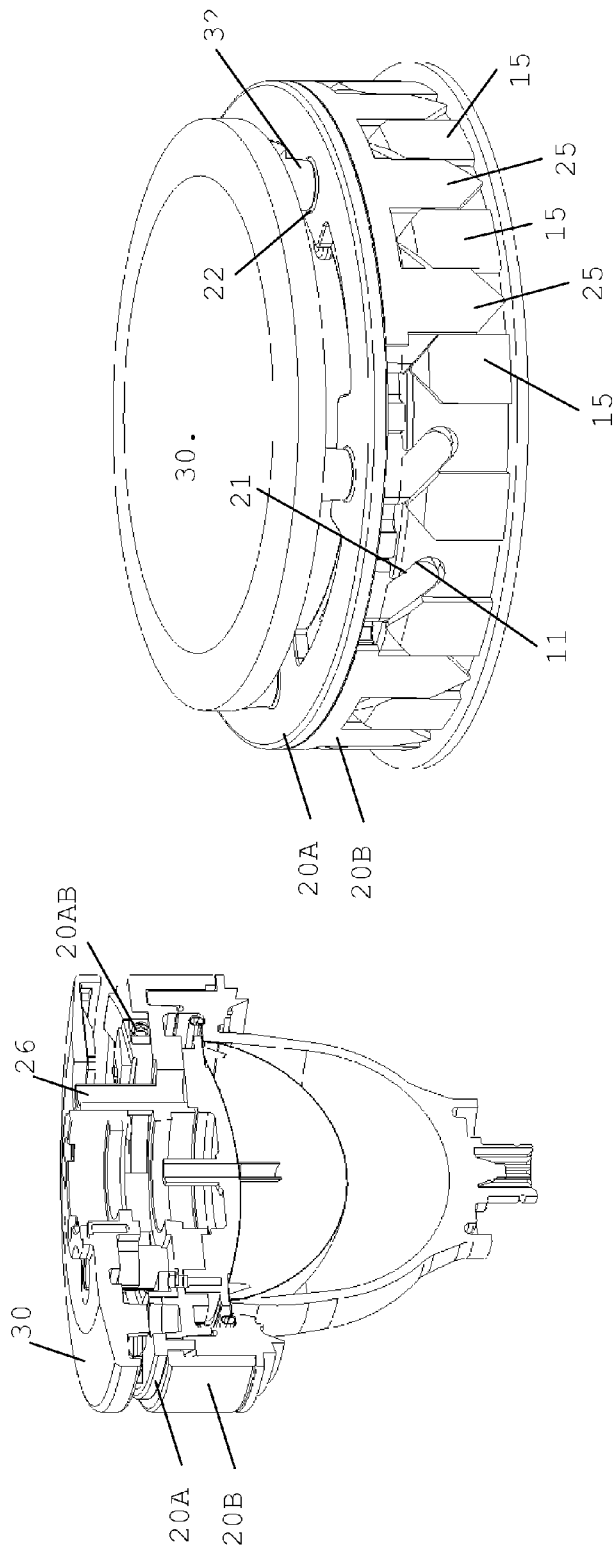

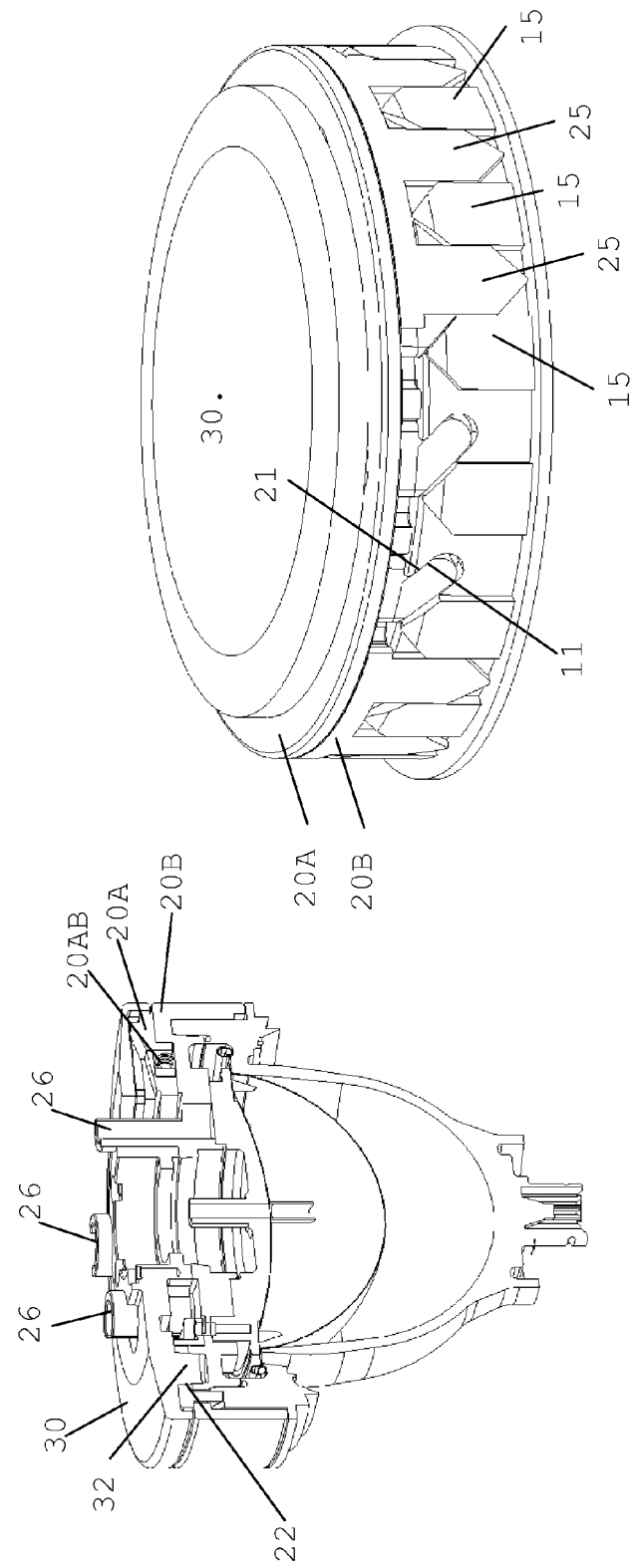

PIVOTALLY CLOSING BEVERAGE INGREDIENT HOLDER WITH A LOCK

CROSS REFERENCE TO RELATED APPLICATIONS

The present application is a National Stage of International Application No. PCT/EP2012/063654, filed on Jul. 12, 2012, which claims priority to European Patent Application No. 11173521.3, filed Jul. 12, 2011, the entire contents of which are being incorporated herein by reference.

FIELD OF THE INVENTION

The field of the invention pertains to beverage preparation devices using receptacles, such as capsules, of an ingredient of the beverage to be prepared, in particular to devices arranged to prepare the beverage by circulation of a liquid into the ingredient receptacle and centrifugation thereof, typically to brew the beverage in the ingredient receptacle and extract the beverage therefrom.

For the purpose of the present description, a "beverage" is meant to include any human-consumable liquid substance, such as tea, coffee, hot or cold chocolate, milk, soup, baby food, etc. . . . A "receptacle" is meant to include any container such as a packaging for containing a pre-portioned beverage ingredient, e.g. a flavouring ingredient, the packaging forming an enclosure, e.g. a capsule, of any material, in particular an airtight or pervious material, porous or non-porous material, e.g. plastic, aluminium, recyclable and/or biodegradable packagings, and of any shape and structure, including soft pods or rigid cartridges for containing the ingredient.

BACKGROUND ART

Certain beverage preparation machines use capsules containing ingredients to be extracted or to be dissolved and/or ingredients that are stored and dosed automatically in the machine or else are added at the time of preparation of the drink. Some beverage machines possess filling means that include a pump for liquid, usually water, which pumps the liquid from a source of water that is cold or indeed heated through heating means, e.g. a thermoblock or the like.

Especially in the field of coffee preparation, machines have been widely developed in which a capsule containing beverage ingredients is inserted in a brewing device. The brewing device is tightly closed about the capsule, water is injected at the first face of the capsule, the beverage is produced in the closed volume of the capsule and a brewed beverage can be drained from a second face of the capsule and collected into a receptacle such as a cup or glass.

Brewing devices have been developed to facilitate insertion of a "fresh" capsule and removal of the capsule upon use. Typically, such brewing devices comprise two parts relatively movable from a configuration for inserting/removing a capsule to a configuration for brewing the ingredient in the capsule. The actuation of the movable part of the brewing device may be motorized. Such a system is for example disclosed in EP 1 767 129. In this case, the user does not have to provide any manual effort to open or close the brewing device. The brewing device has a capsule insertion passage provided with a safety door assembled to the movable part of the brewing device via a switch for detecting an undesired presence of a finger in the passage during closure and prevent injuries by squeezing. The actuation of the movable part of the brewing device may be manual. WO 2009/043630 discloses a beverage preparation machine including a brewing unit having a front part with a passage for inserting a capsule into the brewing unit. The front part is arranged to telescope out of the machine's housing for uncovering the passage for inserting a capsule into the brewing unit and telescopes into the brewing unit for sliding the passage under the housing and thus covering the passage by the housing. A pivotable arched handle is configured for driving the front part manually. WO 2005/004683 and WO 2007/135136 disclose a device comprising a frame, a fixed holding part for the capsule, a movable holding part which is mounted relative to the frame in a sliding relationship, one or two knuckle joint mechanisms that provide a mechanical system for closing in a steady and fluid-tight manner the holding parts about the capsule while also resisting to the counter-force acting while re-opening and generated by the internal brewing pressure, and a handle for directly levering the knuckle joint mechanism.

The preparation of a beverage by using centrifugation is also known. Such beverage preparation includes: providing a beverage (flavoring) ingredient, e.g. as powder and/or leaves, in a receptacle, e.g. in a capsule; circulating liquid into the receptacle and rotating the receptacle at sufficient speed to ensure interaction of the liquid with the ingredient while creating a gradient of pressure of liquid in the receptacle. Such pressure increases gradually from the centre towards the periphery of the receptacle. As liquid traverses the ingredient, e.g. coffee bed, extraction of the ingredient, e.g. coffee compounds, takes place and a liquid extract is obtained that flows out at the periphery of the receptacle. WO2008/148601 describes a possible example of a device using such centrifugal principle. In this case, the ingredient receptacle is a sealed capsule which is opened before its use. Hot water is fed in the centre of the capsule via a water interfacing part comprising a water injector aligned in the rotation axis. The receptacle is held in a capsule holder which is rotated by means of a rotary motor. Both the liquid interfacing part and the capsule holding part are mounted along roller bearings. The beverage is extracted from the capsule by a plurality of peripheral needles that creates openings through a lid of the receptacle. As the capsule is centrifuged about its rotation axis, hot water passes through the beverage ingredient, interacts with it to produce a liquid extract and the resulting liquid extract traverses, under the effect of the centrifugal forces, the peripheral openings and is projected against an impact wall of the collector. The liquid extract, thus constituting the beverage, is then drained through a beverage duct of the device and collected into a recipient such as a cup. WO2008/148650 further describes a device wherein a flow restriction is created downstream of the receptacle, in particular a capsule, for example, by a valve system which opens or enlarges under the pressure created by the centrifuged liquid leaving the receptacle. The valve system can be formed by a mobile restriction part of the device which is elastically urged against a rim portion of the capsule. U.S. Pat. No. 5,566,605 relates to a centrifugal type extraction cell having a deformable sealing joint for hot beverage preparation machine. The cell comprises a drum and a cover defining with the drum an internal volume. The cover is connected to the drum by attachment ears that engage in ramps. In these prior art devices, the water interfacing part which supplies the receptacle with water and the holding part which holds the receptacle are rotatable along frame portions of the device which are secured together by a closure mechanism such as a bayonet system or the like. The holding part is generally mounted on a frame part via at least one roller bearing. The liquid interfacing part is also generally part of a frame part also mounted along at least one roller bearing. When the device is rotated at high speed during centrifugation, the liquid extract creates important axial and radial forces which tend to separate these rotating parts.

A problem of the prior art devices comes from the difficulty to provide a closure of the device about the receptacle that properly resists to axial and radial forces created by the centrifugal pressure of the liquid. In order to maintain a sufficient closure that resists to the centrifugal pressure, a complex closure system is usually required that creates long tolerance chains for accurately holding the receptacle. Furthermore, due to the hydrostatic pressure present in the rotating receptacle, the axial forces tend to provide excessive loads on essential support means of the device such as the roller bearings. As a result, the bearings and other load support mechanical pieces of the device can wear prematurely. In order to prevent these problems, the device must be made more robust but this impacts on the cost of the device.

SUMMARY OF THE INVENTION

A preferred object of the invention is to alleviate one or more of the prior art drawbacks.

The invention relates to a receptacle holding unit and to a device including such a unit for preparing a beverage from at least one ingredient and dispensing such prepared beverage. For instance, the device is a coffee, tea, chocolate, cacao, milk or soup preparation machine. In particular, the device is arranged for preparing within a beverage processing module that includes the receptacle holding unit, a beverage by passing hot or cold water or another liquid through a receptacle held in the unit, such as a held capsule, containing an ingredient, such as a flavouring ingredient, of the beverage to be prepared, such as ground coffee or tea or chocolate or cacao or milk powder.

Such beverage preparation typically includes the mixing of a plurality of beverage ingredients, e.g. water and milk powder, and/or the infusion of a beverage ingredient, such as an infusion of ground coffee or tea with water. For instance, a predetermined amount of beverage is formed and dispensed on user-request, which corresponds to a serving. The volume of such a serving may be in the range of 25 to 250 ml, e.g. the volume for filling a cup or mug, depending on the type of beverage. Formed and dispensed beverages may be selected from ristrettos, espressos, lungos, cappuccinos, café latte, americano coffees, teas, etc. . . . For example, a coffee machine may be configured for dispensing espressos, e.g. an adjustable volume of 20 to 60 ml per serving, and/or for dispensing lungos, e.g. a volume in the range of 70 to 200 ml per serving.

One aspect of the invention relates to a receptacle holding unit for a device for preparing a beverage from an ingredient contained in a receptacle in particular by circulating a liquid into such receptacle and centrifugally driving such receptacle. This unit comprises: a first part; a second part that is movable relative to the first part between a closed position for holding the receptacle in such unit and an open position for inserting the receptacle into such unit and/or for removal therefrom; and a fastening arrangement for fastening the first and second parts together in the closed position.

The fastening arrangement comprises a first engagement surface on the first part and a second engagement surface on the second part, the first and second engagement surfaces are rotationally engaged together about an axis of relative rotation when the parts are in the closed position and disengaged when the parts are in the open position.

For instance, the engagement first and second surfaces may be formed as helical surfaces or bayonet closure surfaces. The first and second parts may each bear one or more engagement surfaces and/or peripherally arranged surfaces. In particular, the engagement surfaces may be peripherally arranged on the first and second parts about a seat for receiving the receptacle in the holding unit.

The first and second engagement surface are typically configured to match each other during the rotational engagement.

The first engagement surface may be formed by a protrusion or projection of the first part and the second engagement surface may be formed by an opening or recess in the second part, or vice versa.

Hence, mechanical connection and disconnection of the first and second parts can be achieved by relative rotation about the axis of rotation of the first and second parts into and out of the connection configuration.

In accordance with the invention, the fastening arrangement comprises a locking member movable between: a locking position for preventing relative rotational movement of the first and second engagement surfaces when the parts are in the closed position; and an unlocking position for allowing relative rotational movement of the first and second engagements surfaces and engagement and disengagement thereof.

Typically, the locking of relative rotation movement between the first and second parts in the closed position prevents axial separation of the first and second parts, i.e. separation of the first and second parts along the direction of the axis of relative rotation.

The locking member can be actuated into the locking and/or unlocking position manually, e.g. by pushing or pulling the locking member, or automatically, e.g. by actuating the locking member by a motor typically via a mechanical transmission.

Such a receptacle holding unit may be static or dynamic during beverage preparation. For instance, the receptacle holding unit is arranged to rotate, in particular at elevated speed, e.g. above 1000 or 2000 RPM, to enhance processing of the ingredient in the receptacle, in particular mixing thereof with a liquid circulated into the receptacle. In the latter configuration, the first and second parts move together during beverage preparation in a manner to be angularly fixed one to another about the axis of relative rotation. The axis of relative rotation may be the same as or different to the axis of relative rotation of the first and second parts into and out of the connection configuration.

Typically, the locking member is arranged to intercept in the locked position at least the second part to prevent relative rotation thereof in the closed position. For example, the locking member and the second part have, respectively, a pin and an opening, or vice versa, the pin entering the opening to lock the second part in rotation.

The locking member can be movable between the locking and unlocking positions along a direction generally parallel to said axis.

In one embodiment, the locking member is configured to relatively drive the first and second parts into the closed and/or open positions. The locking member can be arranged to move along a direction generally parallel to the axis of relative rotation to drive the first and second surfaces in the engagement or disengagement position, by an axial/rotational movement conversion, in particular by a helical conversion.

Hence, the locking member can be driven in a single linear movement, along the axis of relative rotation of the first and second engagement surfaces, first to bring the first and second parts of the holding unit together and then to drive the engagement surfaces in relative rotation into the closed position. The locking member may be driven in a single linear movement, along the axis of relative rotation of the first and second engagement surfaces, first to disengage the engagement surfaces by relative rotation thereof and then to separate the first and second parts of the holding unit.

Thus, a single axial movement of the locking member can be sufficient to bring the first and second parts together, engage the engagement surfaces and lock the engagement surfaces in the closed position. A single axial movement of the locking member may be appropriate to unlock the engagement surfaces, to disengage the engagement surfaces and to separate the first and second parts.

The locking member can thus be used as an actuator for bringing the receptacle holding unit from a configuration for inserting and/or removing an ingredient receptacle to a configuration for processing the ingredient receptacle to prepare a beverage.

Moreover, the locking member may be located away from any receptacle in the holder unit, e.g. on the outside of the first and second parts, so that the locking member is not, or substantially not, exposed to any fluid or pressure rise associated with the processing of the receptacle in the holder unit. Thus, the locking member is not noticeably exposed to any change of condition and mechanical stress due to the processing circumstances of the ingredient receptacle.

In particular, the two parts may be arranged to undergo substantially no movements along the said axis during the processing of the ingredient receptacle. Optionally, the two parts are arranged to be rotated about the said axis. Hence, in such a case, when the locking member is arranged to be movable along the said axis between the open and the closed positions, the first and second parts do not substantially move along this direction and do not interfere with the (locked) state of the locking member.

The first part bearing the first engagement surface may comprise a first index, in particular a plurality of first indexes, and the second part can comprise an assembly of:
 a pre-positioning body that bears a second index, in particular a plurality of second indexes; and
 an engaging body that bears the second engagement surfaces and that is pivotally mounted to the pre-positioning body.

In particular, the first index is arranged to cooperate with the second index for pre-orienting the second engagement surface relative to the first engagement surface to guide mutual engagement thereof at closure of the first and second parts. The engaging and the pre-positioning bodies may be angularly biased into a relative angular orientation for guiding the mutual engagement, in particular biased by one or more springs and/or other elastically deformable elements. Suitable springs include traction and compression springs, helicoidal and spiral and blade springs, discrete and integrated springs. In particular, a spring may be formed integrally with the engaging and/or pre-positioning body (ies), e.g. by moulding, or a spring may be formed as a separate component directly or indirectly assembled to the engaging and pre-positioning bodies.

The first and second parts may have angled first and second indexes, e.g. arrow and counter-arrow like indexes. Preferably, a plurality of indexes are provided corresponding to a plurality of angular pre-positionments for guiding the mutual engagements. Hence, proper relative angular positioning of the first and second parts can be achieved geometrically by the indexes by their interaction at closure.

The locking member may be arranged to intercept in the locked position at least the prepositioning body to angularly block: the engaging body; the prepositioning body; and the first part, so as to prevent relative rotation of the first and second parts.

At least one of the first and second parts may comprise a piercing device for piercing the receptacle. The piercing device may comprise a piercer associated with a liquid channel for guiding a liquid into said receptacle. The piercing device may include a piercer for forming an outlet opening in the receptacle.

In one embodiment, the piercing device is comprised in the second part and the piercing device is angularly fixed relative to the first part when the first and second engagement surfaces are rotationally engaging and disengaging. The piercing device may be in particular angularly fixed to the pre-positioning body when present. The piercing device can comprise a piercer that is off-axis relative to said axis.

Another aspect of the invention relates to a beverage preparation device that has a receptacle holding unit as described above.

The receptacle holding unit can be connected to an actuator for rotatably driving the unit to prepare a beverage. The first and second parts of the unit can be rotatably driven altogether (or en bloc) about an axis that is generally identical to the axis of rotational engagement and disengagement of the first and second engagement surfaces.

The first or the second part can be actuatable by a motor to drive the unit altogether about an axis that is generally identical to this axis, the actuated part driving the other part preferably in a direction of engagement of the first and second engagement surfaces.

The receptacle may be in the form of a capsule that has a flange, e.g. a rim, that can be secured inbetween the first and second parts. The capsule may have a body that is symmetric or asymmetric, conical or frusto-conical or cylindrical or spherical or hemispherical or frusto-spherical, containing the ingredient, e.g. ground coffee, tea or cacao or another beverage ingredient.

The invention also relates to the use of a receptacle containing a beverage ingredient for a receptacle holding unit or for a beverage preparation device as described above.

BRIEF DESCRIPTION OF THE DRAWINGS

The invention will now be described with reference to the schematic drawings, wherein:

FIGS. 4, 5, 6 and 7 show a perspective side and top view of the unit in different configurations and partly cut away; FIGS. 4a, 5a, 6a and 7a illustrating part of the unit shown in FIGS. 4, 5, 6 and 7.

DETAILED DESCRIPTION

Figure 1:
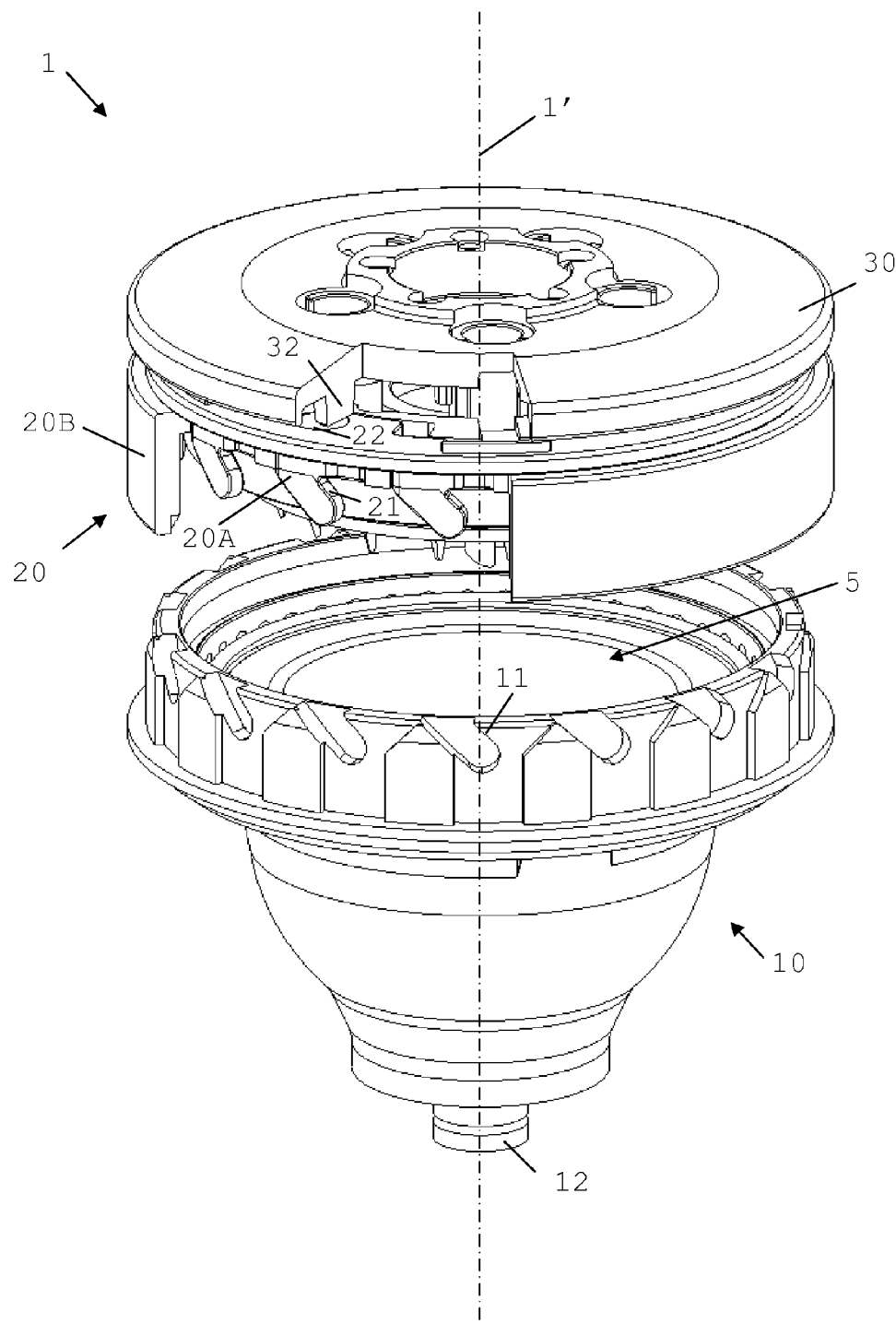
FIG. 1 shows a perspective side and top view of a receptacle holding unit according to invention.

FIGS. 1 to 7a illustrate an exemplary embodiment of a receptacle holding unit 1 and parts thereof in accordance with the invention.

Receptacle holding unit 1 can be incorporated into an ingredient processing module of a beverage preparation device, typically of the centrifugal type, e.g. as disclosed in EP 2 000 062, EP 2 155 020, EP 2 152 128, WO 2008/148646, WO 2009/106175, WO 2009/106589, WO 2010/026045, WO 2010/026053 and WO 2010/066736. Unit 1 has a seat 5 for receiving and housing an ingredient receptacle 2, e.g. of the type disclosed in the same references or in WO 2008/148650, WO 2008/148834, WO 2010/066705, WO 2010/063644 and WO 2011/023711. The receptacle may be of the type described above under the header "field of the invention". Receptacle 2 may be a capsule that has a container-body 2', e.g. a generally cup-shaped or hemispherical or hemi-ellipsoidal body, having a rim or a flange 2" to which a cover lid 2''' is attached, in particular sealed, as illustrated in FIG. 4.

Unit 1 is usually configured to circulate a liquid into receptacle 2, typically for mixing with the ingredient, e.g. brewing the ingredient, contained in receptacle 2. A flavoured beverage may be prepared by circulating a carrier liquid, such as water, into the receptacle for mixing the carrier with the ingredient and form the beverage, e.g. by brewing. An automatic receptacle recognition system may be used to parameterize and adjust the processing of the ingredient automatically in line with the type of ingredient.

When closed or partly-closed receptacles 2 of flavouring ingredients, e.g. ingredient capsules, are used, unit 1 may include a receptacle opener 27,29 such as blades and/or a tearing tool. Alternatively, receptacle 2 may be a partly or fully self-opening capsule, e.g. under the effect of centrifugation and/or pressure of liquid circulated into receptacle 2. Receptacle 2 may be of the open-type, in which case no opener is needed. For instance, before use in unit 1, receptacle 2 has a lid 2''' that is entirely closed, or at least closed at its periphery facing openers 29 and pre-opened or liquid pervious in a central area facing opener 27. In the latter case, opener 27 can be omitted and replaced by a non-opening liquid feed channel. Conversely, before use in unit 1, lid 2''' may be closed in its centre facing opener 27 and pre-opened or liquid pervious in its periphery facing openers 29. In this case, openers 29 can be omitted.

Typically, a beverage preparation device comprising unit 1 of the invention further includes one or more of the following components:
  a) a fluid system in which unit 1 is in fluid communication;
  b) an in-line heater for heating a flow of liquid circulated through unit 1 or a batch heater for circulating heated liquid from the batch heater to unit 1;
  c) a pump for pumping liquid to unit 1, in particular a low pressure pump e.g. within the range of 1 to 5 bar, such as 1.5 to 3 bar;
  d) a motor for driving unit 1 in rotation during beverage preparation;
  e) an electric control unit, in particular comprising a printed circuit board (PCB), for receiving instructions from a user via an input user-interface and for controlling the heater, pump and motor; and/or
  f) one or more sensors for sensing at least one characteristic selected from characteristics of fluid system including unit 1, the heater, the pump, a liquid tank, an ingredient collector, a flow of the liquid (e.g. by a flowmeter), a pressure of the liquid and a temperature of the liquid, and for communicating such characteristic(s) to the control unit.

Moreover, receptacle holding unit 1 is typically associated with a beverage collection and dispensing system, e.g. as disclosed in WO 2009/106175 and WO 2010/089329.

Receptacle holding unit 1 comprises: a first part 10; a second part 20 that is movable relative to first part 10 between a closed position (FIG. 6) for holding receptacle 2 in such unit 1 and an open position (FIGS. 1 and 4) for inserting receptacle 2 into such unit 1 and/or for removal therefrom. Unit 1 further includes a fastening arrangement for fastening first and second parts 10,20 together in the closed position.

For instance, second part 20 is freely separable from first part 19 in the open position. Alternatively, first and second parts 10,20 may be associated with a guiding arrangement (not shown), e.g. guiding rails or slots with end-of-movement stoppers, for guiding the relative movement of first and second parts 10,20 from the open and closed position so that first and second parts 10,20 are permanently mechanically linked together during the normal use of unit 1 (excluding servicing or repairing operations involving a dismantling of unit 1).

First part 10 may have a cavity 10' for containing receptacle 2 and second part 20 may form a lid or cover over cavity 10'.

The fastening arrangement comprises a first engagement surface 11 on first part 10 and a second engagement surface 21 on second part 20. First and second engagement surfaces 11,21 are rotationally engaged together about an axis 1' of relative rotation when the parts 10,20 are in the closed position and disengaged when parts 10,20 are in the open position.

Figure 2:
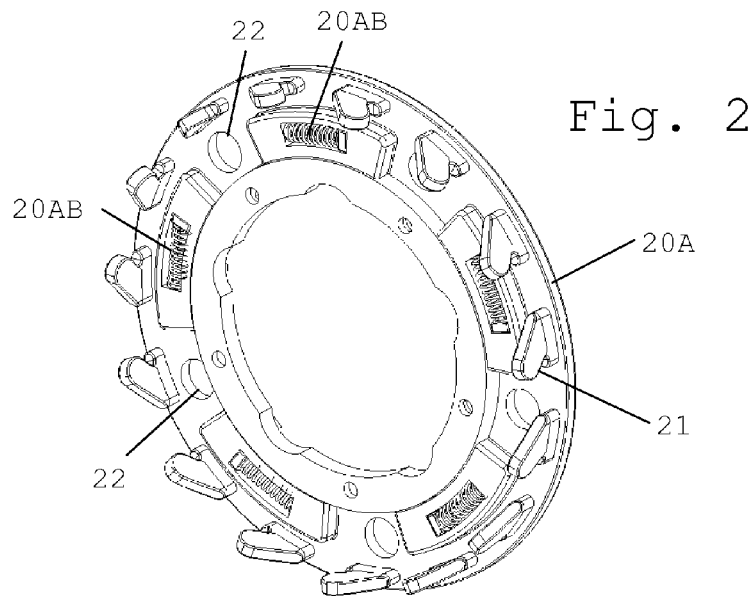
FIG. 2 illustrates a perspective view from below of a component of a top part of the unit of FIG. 1.
Figure 3:
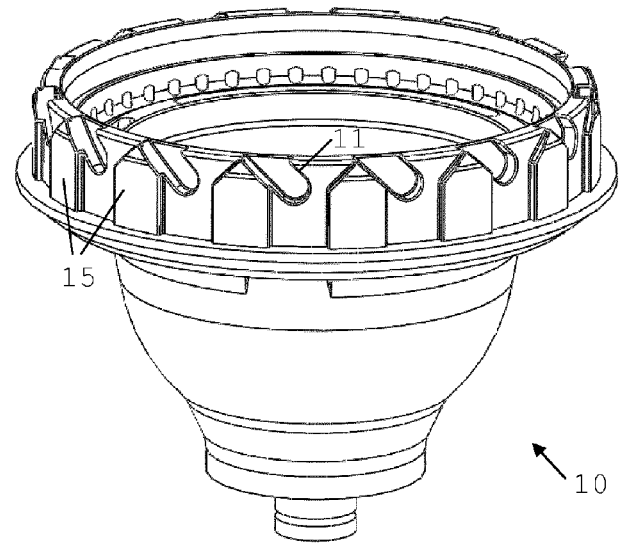
FIG. 3 illustrates a perspective side and top view of a bottom part of the unit of FIG. 1.

Engagement first and second surfaces 11,21 are formed as helical surfaces as illustrated in FIGS. 1 and 2. Alternatively, these surfaces may be formed as bayonet closure surfaces. In the illustrated embodiment of unit 1, first and second parts 10,20 each bear a plurality of engagement surfaces 11,21 peripherally arranged about receptacle seat 5.

As illustrated by way of example, second engagement surfaces 21 can be formed by helical fingers that protrude from second part 20 and first engagement surfaces 11 may be formed as corresponding openings or recesses substantially matching the shape of the fingers. Other shapes of engagement surfaces are also contemplated.

Hence, mechanical connection and disconnection of first and second parts 10,20 can be achieved by relative rotation about axis 1' of the first and second parts into and out of the closed configuration, as shown in the sequence illustrated in FIGS. 4, 5, 6 and 7.

In accordance with the invention, the fastening arrangement further comprises a locking member 30 movable between: a locking position (FIG. 7) for preventing relative rotational movement of first and second engagement surfaces 11,21 when parts 10,20 are in the closed position; and an unlocking position (FIGS. 4, 5 and 6) for allowing relative rotational movement of first and second engagements surfaces 11,21 and engagement and disengagement thereof.

Typically, the locking of relative rotation movement between first and second parts 10,20 in the closed position prevents axial separation of first and second parts 10,20, i.e. separation of first and second parts 10,20 along the direction of axis 1' of relative rotation.

Locking member 30 can be actuated into the locking and/or unlocking position manually, e.g. by pushing or pulling locking member 30, or automatically, e.g. by actuating locking member 30 by a motor (not shown) for instance via a mechanical transmission (not shown).

Such a receptacle holding unit 1 may be static or dynamic during beverage preparation. For instance, receptacle holding unit 1 is arranged to rotate, e.g. centrifuged, in particular at elevated speed, e.g. above 1000 or 2000 RPM, to enhance processing of the ingredient in receptacle 2, in particular mixing thereof with a liquid circulated into receptacle 2. In the latter configuration, first and second parts 10,20 move together during beverage preparation in a manner to be angularly fixed one to another about axis 1' of relative rotation into and out of the connection configuration. Axis 1' of relative rotation of first and second parts 10,20 may be the same as or different to the axis of ingredient processing rotation of first and second parts 10,20. For instance, parts 10,20 are rotated about axis 1' during beverage preparation by driving part 10 or part 20 by a motor, in particular into the direction of engagement of engaging surfaces 11,21 to enhance closure of parts 10,20. Typically, a motor (not shown) drives part 10 in rotation about axis 1', e.g. via connector 12. In the configuration shown in FIG. 1, the motor can drive part 10 about axis 1' in the clockwise direction to drive surface 11 against surface 21 into the direction of mutual engagement.

Typically, locking member 30 is arranged to intercept in the locked position (FIG. 7) at least second part 20 to prevent relative rotation thereof in the closed position. Locking member 30 and second part 20 may include a pin 32 and a cooperating opening 22, respectively, or vice versa, pin 32 entering opening 22 to lock second part 20 in rotation about axis 1' relative to locking member 30 and first part 10.

Locking member 30 can be movable between the locking position (FIG. 7) and the unlocking position (FIG. 6) along a direction generally parallel to axis 1'.

Locking member 30 may be configured to relatively drive first and second parts 10,20 into the closed and/or open positions as illustrated in the sequence shown in FIGS. 4 to 6a. For example, locking member 30 is used to push second part 20 during the closing movement, in particular opening 22 and pin 32 are non-aligned until the closed position is reached (FIG. 6) so that pin 32 of locking member 30 pushes second part 20. During the re-opening movement, locking member 30 may be used to pull second part 20, for example via one or more appropriate traction arms 26 extending between locking member 30 and second part 20. Traction arm 26, for instance fixed to or integral with second part 20, may allow small axial movements of locking member 30 relative to second part 20 to permit a locking movement of locking member 30 between the locking position (FIG. 7) and the unlocking position (FIG. 6).

Locking member 30 can be arranged to move along a direction generally parallel to axis 1' to drive the first and second surfaces in the engagement or disengagement position, by an axial/rotational movement conversion, in particular by a helical conversion.

Hence, locking member 30 can be driven in a single linear movement, e.g. along axis 1' of relative rotation of first and second engagement surfaces 11,21, first to bring first and second parts 10,20 of holding unit 1 together, as illustrated in the sequence of FIGS. 4 to 6, and then to drive engagement surfaces 11,21 in relative rotation into the closed position as illustrated in the sequence of FIGS. 6 and 7.

In an inverted actuation, locking member 30 may be driven in a single linear movement, e.g. along axis 1' of relative rotation of the first and second engagement surfaces 11,21, first to disengage engagement surfaces 11,21 by relative rotation thereof and then to separate first and second parts 10,20 of the holding unit 1.

Thus, a single axial movement of locking member 30 can be sufficient to bring first and second parts 10,20 together (FIGS. 4 to 5), engage engagement surfaces 11,21 (FIGS. 5 to 6) and lock engagement surfaces 11,21 in the closed position (FIGS. 6 to 7). Likewise, a single axial movement of locking member 30 may be appropriate to unlock engagement surfaces 11,21, to disengage engagement surfaces 11,21 and to separate first and second parts 10,20.

Locking member 30 can thus be used as an actuator for bringing receptacle holding unit 1 from a configuration for inserting and/or removing an ingredient receptacle 2 to a configuration for processing ingredient receptacle 2 to prepare a beverage, and/or vice versa.

Moreover, locking member 30 may be located away from any receptacle 2 in the holder unit 1, e.g. on the outside of the first and second parts 10,20, so that locking member 30 is not, or substantially not, exposed to any fluid or pressure rise associated with the processing of receptacle 2 in holder unit 1. Thus, in such a case, locking member 30 is not noticeably exposed to any change of condition or mechanical stress due to the processing conditions of ingredient receptacle 2.

As illustrated in detail in FIGS. 4a, 5a, 6a and 7a, first part 10 bearing first engagement surface 11 may comprise a first index, in particular a plurality of first indexes 15, and second part 20 can comprise an assembly of:
   a pre-positioning body 20B that bears a second index 25, in particular a plurality of second indexes; and
   an engaging body 20A that bears second engagement surfaces 21 and that is pivotally mounted to pre-positioning body 20B.

In particular, first index 15 is arranged to cooperate with second index 25 for pre-orienting second engagement surface 21 relative to first engagement surface 11 to guide mutual engagement thereof at closure of first and second parts 10,20 as illustrated in FIG. 5a. Engaging and pre-positioning bodies 20A,20B may be angularly biased into a relative angular orientation for guiding the mutual engagement, in particular biased by one or more springs 20AB, such as helical springs, and/or by other elastically deformable elements. Hence, when the two parts 10,20 are spaced apart, e.g. as illustrated in FIGS. 1 and 4a, engaging surfaces 11,21 are biased into alignment for engagement when indexes 15,25 have properly oriented parts 10,20 as illustrated in FIG. 5a.

First part 10 and second part 20 may have angled or tapered first and second indexes 15,25, e.g. arrow-like or triangular-like indexes, and correspondingly counter-shaped indexes 25,15. Preferably, a plurality of indexes 15,25 are provided corresponding to a plurality of possible angular pre-positionings for guiding the mutual engagements. Hence, proper relative angular positioning of first and second parts 10,20 can be achieved geometrically by indexes 15,25.

Locking member 30,32 may be arranged to intercept in the locked position (FIG. 7) at least engaging body 20A,22 to angularly block: engaging body 20A,21; prepositioning body 20B,25; and first part 10 via indexes 15 and engaging surfaces 11, so as to prevent relative rotation of first and second parts 10,20 in the locked position.

At least one of first and second parts 10,20 may comprise a piercing device 20C for piercing receptacle 2. Piercing device 20C may comprise a piercer 27 associated with a liquid channel 28 for guiding a liquid into receptacle 2. Piercer 29 may be generally coaxial with axis 1'.

Piercing device 20C may include a piercer 29 for forming an outlet opening in receptacle 2.

In one embodiment, piercing device 20C is comprised in second part 20 and piercing device 20C is angularly fixed relative to first part 10 when the first and second engagement 11,21 surfaces are rotationally engaging and disengaging.

Piercing device 20C may be in particular angularly fixed to the pre-positioning body 20B when present. Piercing device 20C can comprise a piercer 29 that is off-axis relative to axis 1'. In particular, device 20C may include a plurality of peripherally-arranged piercers 29.

By avoiding rotational movements of piercing device 20C during closure of the system, rotation of engaging body 20A does not drive in rotation piercing device 20C whereby receptacle 2 is not subjected to annular tearing by peripherally arranged pierces 29 when they pierce receptacle 2.

Receptacle holding unit 1 is typically mounted in a beverage preparation device as discussed above.

Receptacle holding unit 1 can be connected, e.g. via connector 12, to an actuator for rotatably driving unit 1 to prepare a beverage. First and second parts 10,20 of unit 1 can be rotatably driven altogether (en bloc) about an axis that is generally identical to axis 1' of rotational engagement and disengagement of first and second engagement surfaces 11,21.

First part 10 or second part 20 can be actuatable by a motor to drive the unit altogether about an axis that is generally identical to axis 1', the actuated part 10 driving the other part 20 preferably in a direction of engagement of first and second engagement surfaces 11,21, e.g. clockwise driving of part 10 in the configuration illustrated in FIG. 7.

Receptacle 2 may be in the form of a capsule that has a flange 2", e.g. a rim, that can be secured inbetween first and second parts 10,20. The capsule may have a body 2' that is, symmetric or asymmetric, conical or frusto-conical or cylindrical or spherical or hemispherical or frusto-spherical, containing the ingredient, e.g. ground coffee, tea or cacao or another beverage ingredient.

The invention claimed is:

1. A receptacle holding unit for a device for preparing a beverage from an ingredient contained in a receptacle by circulating a liquid into the receptacle and centrifugally driving the receptacle, the receptacle holding unit comprising:
    a first part;
    a second part that is movable relative to the first part between a closed position for holding the receptacle in the receptacle holding unit and an open position for inserting the receptacle into the receptacle holding unit and/or for removal therefrom;
    a fastening arrangement for fastening the first and second parts together in the closed position,
    the fastening arrangement comprising a first engagement surface on the first part and a second engagement surface on the second part, the first and second engagement surfaces being rotationally engaged together about an axis when the parts are in the closed position and disengaged when the parts are in the open position; and
    the fastening arrangement comprises a locking member movable between:
    a locking position for preventing relative rotational movement of the first and second engagement surfaces when the parts are in the closed position; and
    an unlocking position for allowing relative rotational movement of the first and second engagements surfaces and engagement and disengagement thereof,
    wherein the first part bearing the first engagement surface comprises a first index and the second part comprises an assembly of:
    a pre-positioning body that bears a second index; and
    an engaging body that bears the second engagement surface and that is pivotally mounted to the pre-positioning body,
    the first index cooperating with the second index for pre-orienting the second engagement surface relative to the first engagement surface to guide mutual engagement thereof at closure of the first and second parts.

2. The receptacle holding unit of claim 1, wherein the locking member is arranged to intercept in the locked position at least the second part to prevent relative rotation thereof in the closed position.

3. The receptacle holding unit of claim 1, wherein the locking member is movable between the locking and unlocking positions along a direction generally parallel to the axis.

4. The receptacle holding unit of claim 1, wherein the locking member is configured to relatively drive the first and second parts into the closed position and/or the open position.

5. The receptacle holding unit of claim 4, wherein the locking member is arranged to move along a direction generally parallel to the axis to drive the first and second surfaces in the engagement position or the disengagement position, by an axial or rotational movement conversion.

6. The receptacle holding unit of claim 5, wherein the axial or rotational movement conversion is a helical conversion.

7. The receptacle holding unit of claim 1, wherein the locking member is arranged to intercept in the locked position at least the engaging body to angularly block: the engaging body; the prepositioning body; and the first part, so as to prevent relative rotation of the first and second parts.

8. The receptacle holding unit of claim 1, wherein at least one of the first and second parts comprises a piercing device for piercing the receptacle.

9. The receptacle holding unit of claim 8, wherein the piercing device comprises a piercer associated with a liquid channel for guiding a liquid into the receptacle.

10. The receptacle holding unit of claim 9, wherein the piercer is coaxial with the axis.

11. The receptacle holding unit of claim 8, wherein the piercing device comprises a piercer for forming an outlet opening in the receptacle.

12. The receptacle holding unit of claim 11, wherein the piercer is off the axis.

13. The receptacle holding unit of claim 8, wherein the piercing device is comprised in the second part and wherein the piercing device is angularly fixed relative to the first part when the first and second engagement surfaces are rotationally engaging and disengaging.

14. The receptacle holding unit of claim 1, wherein the locking member is arranged to be moved manually or automatically via a mechanical connection to a motor into the locking position and/or the unlocking position.

15. The receptacle holding unit of claim 1, wherein the first index comprises a plurality of indexes.

16. The receptacle holding unit of claim 1, wherein the second index comprises a plurality of second indexes.

17. A beverage preparation device for preparing a beverage from an ingredient contained in a receptacle by circulating a liquid into the receptacle and centrifugally driving the receptacle, the beverage preparation device comprising a receptacle holding unit comprising a first part, a second part that is movable relative to the first part between a closed position for holding the receptacle in the receptacle holding unit and an open position for inserting the receptacle into the receptacle holding unit and/or for removal therefrom, a fastening arrangement for fastening the first and second parts together in the closed position, the fastening arrangement comprising a first engagement surface on the first part and a second engagement surface on the second part, the first and second engagement surfaces being rotationally engaged together about an axis when the first and second parts are in the closed position and disengaged when the parts are in the open position, and the fastening arrangement comprises a locking member movable between:
- a locking position for preventing relative rotational movement of the first and second engagement surfaces when the parts are in the closed position, and
- an unlocking position for allowing relative rotational movement of the first and second engagements surfaces and engagement and disengagement thereof,
- the first part bearing the first engagement surface comprises a first index and the second part comprises an assembly of:
  - a pre-positioning body that bears a second index; and
  - an engaging body that bears the second engagement surface and that is pivotally mounted to the pre-positioning body,
  - the first index cooperating with the second index for pre-orienting the second engagement surface relative to the first engagement surface to guide mutual engagement thereof at closure of the first and second parts.

18. The beverage preparation device of claim 17, wherein the receptacle holding unit is connected to an actuator for rotatably driving the receptacle holding unit to prepare a beverage, the first and second parts of the receptacle holding unit being rotatably driven altogether about an axis that is generally identical to the axis of rotational engagement and disengagement of the first and second engagement surfaces.

* * * * *